United States Patent
Zvonkovic

(10) Patent No.: US 7,305,960 B2
(45) Date of Patent: Dec. 11, 2007

(54) PISTON FOR AN INTERNAL COMBUSTION ENGINE

(75) Inventor: Josip Zvonkovic, Weinstadt (DE)

(73) Assignee: Mahle GmbH, Stuttgart (DE)

( * ) Notice: Subject to any disclaimer, the term of this patent is extended or adjusted under 35 U.S.C. 154(b) by 311 days.

(21) Appl. No.: 10/520,764

(22) PCT Filed: Jul. 8, 2003

(86) PCT No.: PCT/DE03/02289

§ 371 (c)(1),
(2), (4) Date: Aug. 1, 2005

(87) PCT Pub. No.: WO2004/008006

PCT Pub. Date: Jan. 22, 2004

(65) Prior Publication Data

US 2006/0042584 A1    Mar. 2, 2006

(30) Foreign Application Priority Data

Jul. 11, 2002    (DE)    ................. 102 31 233

(51) Int. Cl.
*F02F 3/00* (2006.01)
(52) U.S. Cl. .................... 123/193.6; 92/187
(58) Field of Classification Search ............ 123/193.6; 92/187; 29/888.042
See application file for complete search history.

(56) References Cited

U.S. PATENT DOCUMENTS

| | | | |
|---|---|---|---|
| 3,357,318 A | 12/1967 | Packard et al. | |
| RE26,764 E * | 1/1970 | Packard et al. | 92/187 |
| 4,124,010 A | 11/1978 | Fiedler | |
| 5,063,831 A * | 11/1991 | Byard | 92/187 |
| 5,653,156 A | 8/1997 | Issler et al. | |
| 6,923,153 B2 * | 8/2005 | Rein et al. | 123/193.6 |
| 7,107,893 B2 * | 9/2006 | Weinkauf et al. | 92/187 |
| 2005/0150374 A1 * | 7/2005 | Weinkauf et al. | 92/157 |

FOREIGN PATENT DOCUMENTS

| | | |
|---|---|---|
| DE | 1209804 | 12/1958 |
| DE | 21 52 462 | 4/1973 |
| DE | 27 56 878 | 6/1978 |
| DE | 30 36 062 | 4/1982 |
| DE | 33 01 366 | 7/1984 |
| DE | 43 27 772 | 2/1995 |
| DE | 44 31 990 | 3/1996 |
| DE | 44 41 450 | 5/1996 |
| GB | 1 405 959 | 10/1975 |
| JP | 2001295697 | 10/2001 |
| JP | 2002130050 | 5/2002 |

OTHER PUBLICATIONS

International Search Report.

\* cited by examiner

*Primary Examiner*—Marguerite McMahon
(74) *Attorney, Agent, or Firm*—Collard & Roe, P.C.

(57) ABSTRACT

The invention relates to a piston for an internal combustion engine, which comprises two boss bores that have respective outer areas with an oval cross-section that points on one side in the direction of the piston head. The great axis of the ovality is parallel to the piston axis and the degree of ovality increases towards the outer end of the boss bores.

3 Claims, 2 Drawing Sheets

PISTON FOR AN INTERNAL COMBUSTION ENGINE

CROSS REFERENCE TO RELATED APPLICATIONS

Figure 1:
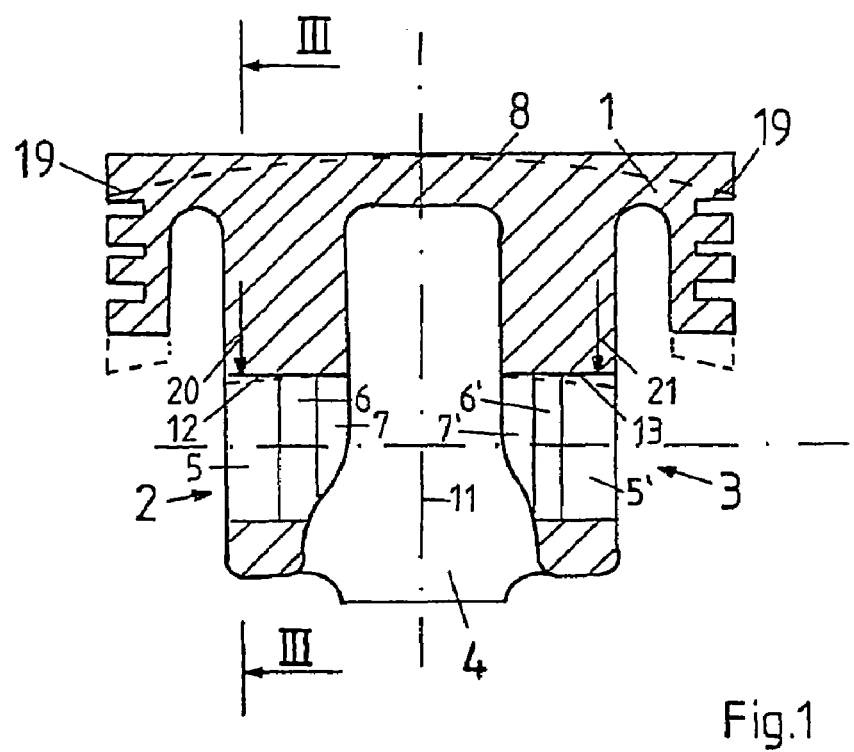

Applicant claims priority under 35 U.S.C. §119 of German Application No. 102 31 233.8 filed on Jul. 11, 2002. Applicant also claims priority under 35 U.S.C. §365 of PCT/DE2003/002289 filed on Jul. 8, 2003. The international application under PCT article 21 (2) was not published in English.

The invention relates to a piston for an internal combustion engine, in accordance with the preamble of claim 1.

A piston having pin bores, each of which is divided into an inner, a center, and an outer region, is known from DE-OS 44 31 990. In order to prevent friction contacts from forming between the pin and the pin bore, in the case of a short and rigid piston pin, as the result of deformation of the piston caused by great stress on the piston, i.e. by a high ignition pressure and by a great heat impact, particularly in the pin boss regions, both the inner and the outer regions of the pin bores of the known piston, in each instance, are configured as profiled pin bores. However, pistons that are under great gas pressure stress and heat stress experience a deformation in which the edge region of the piston head bends downward in the pin direction, i.e. with reference to the center of the piston head, particularly in the case of a short piston pin length, i.e. in the case of a ratio of the piston pin length to the piston diameter of less than 0.7. This has the result that such great forces act on the zenith of the outer regions of the pin bores that the inside walls of the pin bores come into friction contact with the mantle surface of the piston pin there, and this can result in damage both to the inside walls of the pin bores and to the mantle surface of the piston pin.

Proceeding from this, the invention is based on the task of avoiding pin boss friction even at greater stress on the piston.

The solution of this problem is achieved with the characteristics according to the characterizing part of claim 1.

Practical embodiments of the invention are the object of the dependent claims.

Pin bores according to the invention, having outer regions that are oval-shaped on one side or both sides, whereby the great axis of ovality lies parallel to the piston axis, have the advantage that the zenith of the outer regions of the pin bores does not touch the mantle surface of the piston pin, so that no pin boss friction can occur here, and furthermore, a sufficient oil reservoir always remains in existence between the pin bore zenith and the mantle surface of the piston pin, thereby guaranteeing good lubrication of the piston pin even in the case of greater stress on the piston.

Figure 2:
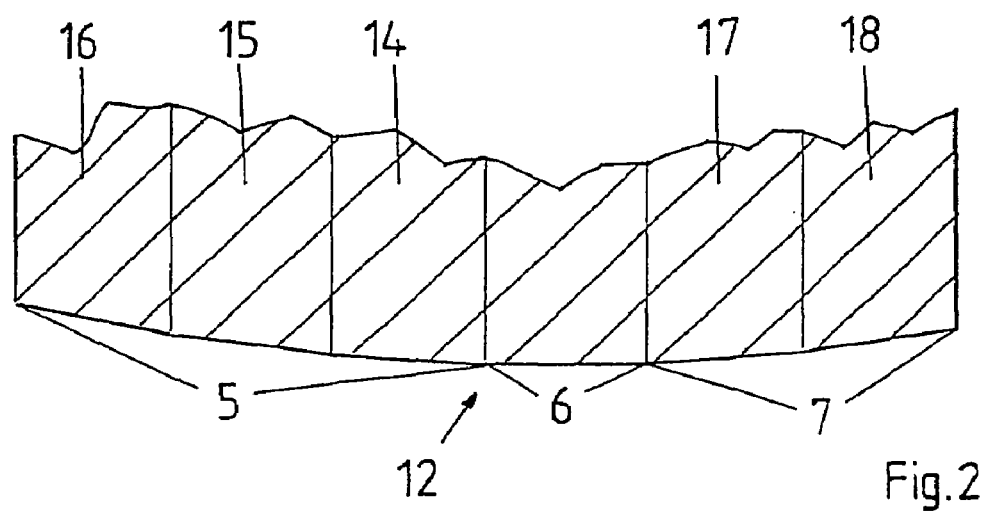
Figure 3:
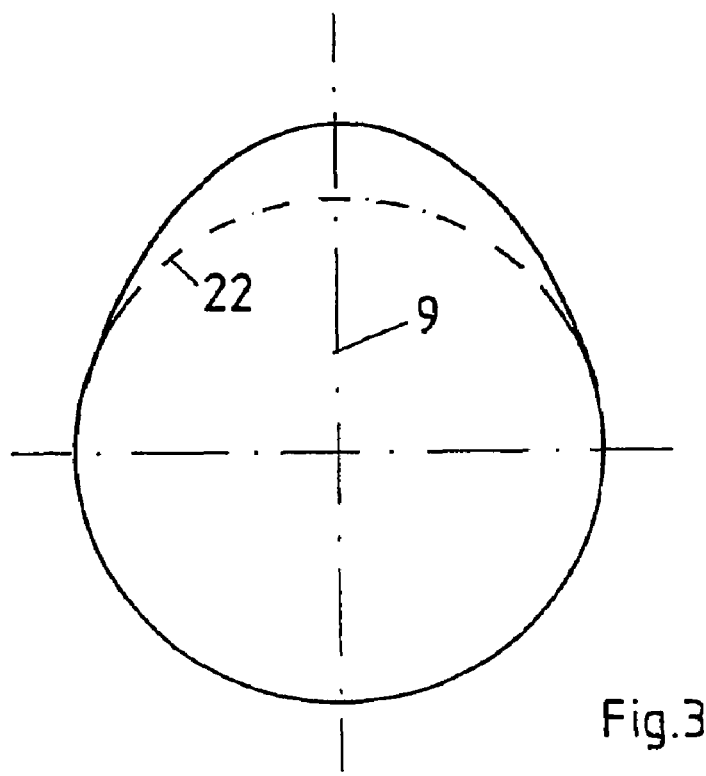
Figure 4:
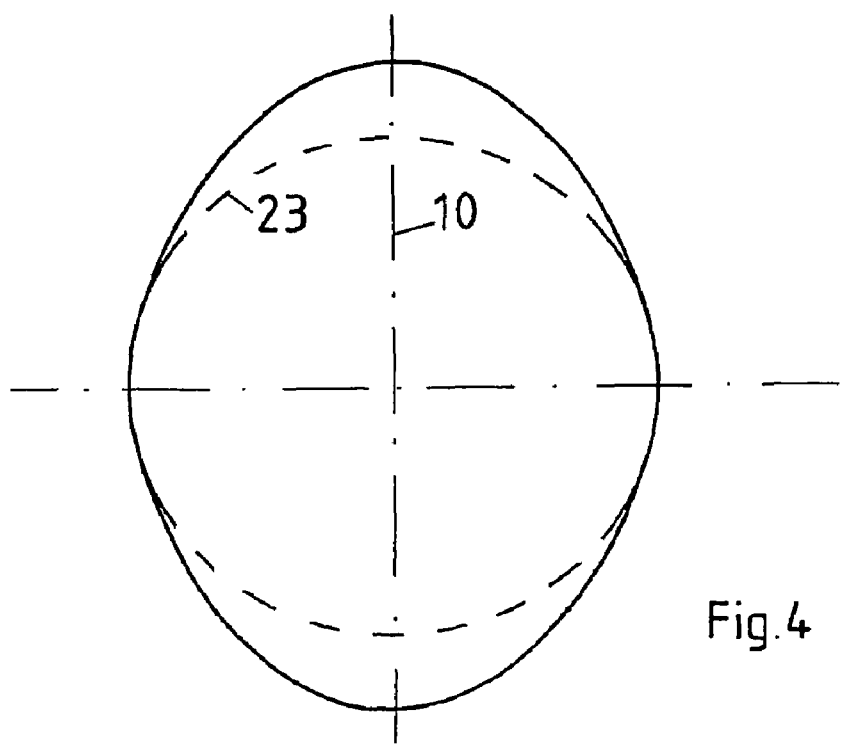

The invention is explained in greater detail below, on the basis of a preferred exemplary embodiment shown in the drawings. These show:

FIG. 1 a piston in cross-section, with pin bores according to the invention,

FIG. 2 an enlarged view of the zenith of the left pin bore in partial cross-section, FIG. 3 a cross-section through the outer segment of one of the pin bores, along the line III-III in FIG. 1, and FIG. 4 a cross-section through the outer segment of another embodiment of the pin bores.

A piston 1 shown in cross-section in FIG. 1 is structured as a trunk piston, in which the length of the piston pin is less than 70% of the diameter of the cylinder. In particular, this is a high-strength steel piston as used in diesel engines. The cross-section through the piston is selected in such a manner that the two pin bores 2 and 3 can be seen, but the piston skirt 4 is only shown in a top view.

The two pin bores 2, 3 each have an outer region 5, 5', a center region 6, 6', and an inner region 7, 7'. The inner region 7, 7' is configured as a profiled bore that narrows conically from the interior of the piston towards the outside. The center region 6, 6' is configured in circular cylinder shape. The outer region 5, 5' has a cross-section having an oval cross-sectional shape on one side, in the direction of the piston head 8, as shown in FIG. 3, which is a cross-section along the line III-III in FIG. 1. In this connection, a cross-section of the region 5, 5' having an oval cross-sectional shape on both sides, as shown in FIG. 4, is also possible. In both cases, the great axis of ovality 9 or 10, respectively, lies parallel to the piston axis 11. In FIGS. 3 and 4, a piston pin that is mounted in the pin bores is indicated with broken lines 22, 23.

The exact shape of the pin bores 2 and 3 results from the cross-section of the zenith 12 of the left pin bore 2, as shown in FIG. 2, the mirror image of which corresponds to the shape of the zenith 13 of the right pin bore 3. The zenith of the outer region 5 is divided into three segments 14, 15, 16 in the present exemplary embodiment, with an increasing incline of the segments of the draft of traverse that delimits the three segments 14, 15, 16, towards the exterior of the piston, and from this it is evident that the ovality of the cross-section of the outer region 5 of the pin bores 2, 3, according to FIG. 3, increases from the interior of the piston towards the outside.

The outer region 5 is followed by the center region 6, which is configured as a circular cylinder, and the inner region 7, which inner region 7, configured as a profiled bore, has a circular cross-section, the radius increase of which results from the increasing incline of the two segments 17 and 18 of the zenith of the inner region 7.

The piston 1 according to FIG. 1 is designed in such a manner that only a short pin is required, which hardly bends even at greater gas pressure. However, at greater gas pressure, the piston 1 experiences a deformation that is shown in exaggerated manner by means of the dotted line 19. This has the result that great forces act on the pin bores 2 and 3 in the direction of the arrows 20 and 21, which forces cause a deformation of the zenith of these bores 2, 3 in a direction pointing away from the piston head 8. Because of the fact that in this region 5, 5', the pin bores 2, 3 have an ovality that is directed upward, as shown in FIG. 3, and the piston pin, which is not shown in FIG. 1, has a circular cylindrical shape, the forces in the direction of the arrows 20 and 21 merely have the effect that the ovality of the pin bores 2, 3 decreases slightly in the direction of the circular shape, and thereby the distance of the zenith of the pin bores 2, 3 from the surface of the piston pin in the region 5, 5' decreases slightly. A remaining ovality of the pin bores 2, 3 in the region 5, 5' always remains, however, and as a result, for one thing, it is avoided that the zenith of the pin bores 2, 3 comes into contact with the surface of the piston pin in the region 5, 5', and that the piston pin is damaged due to friction on the inside walls of the pin bores 2, 3, under the influence of the forces in the direction of the arrows 20, 21, or that the piston pin damages the pin bores 2, 3. For another thing, an oil reservoir is maintained in the region 5, 5', between the piston pin and the zenith of the pin bores 2, 3, as a result, and this guarantees good lubrication of the piston pin, even under elevated gas pressure.

REFERENCE SYMBOL LIST

1 piston
2 pin bore
3 pin bore
4 piston skirt
5 outer region of 2, 3
6 center region of 2, 3
7 inner region of 2, 3
8 piston head
9 great axis of ovality
10 great axis of ovality
11 piston axis
12 zenith of 2
13 zenith of 3
14 segment of 5
15 segment of 5
16 segment of 5
17 segment of 7
18 segment of 7
19 dotted line
20 arrow
21 arrow
22 broken line
23 broken line

The invention claimed is:

1. Piston (1) for an internal combustion engine, having a piston head (8) and having two piston pin bosses disposed on the side of the piston (1) facing away from the piston head (8), spaced apart from one another, each of which has a pin bore (2, 3) having an inner region (7, 7), a center region (6, 6), and an outer region (5, 5), whereby the inner region (7, 7) is configured as a conically shaped profiled bore, and the center region (6, 6) is configured as a circular cylinder, wherein the outer region (5, 5) has a cross-section with an oval cross-sectional shape on one side, in the direction of the piston head (8), whereby the great axis of ovality lies at least approximately parallel to the piston axis (11), and whereby the degree of ovality increases from the border of the center region (6, 6) to the outer end of the pin bore (2, 3).

2. Piston as recited in claim 1, wherein the degree of ovality of the outer region (5, 5) increases in several segments (14, 15, 16), whereby each segment (15, 16) follows the preceding one (14, 15) without any step.

3. Piston as recited in claim 1, wherein the outer region (5, 5) has a cross-section having an oval cross-sectional shape on both upper and lower sides.

\* \* \* \* \*